J. W. LUNDAHL & O. A. EKSTROM.
AUTOMATIC IGNITION SYSTEM FOR GAS LIGHTS.
APPLICATION FILED SEPT. 6, 1913.
1,104,522.
Patented July 21, 1914.
2 SHEETS—SHEET 1.
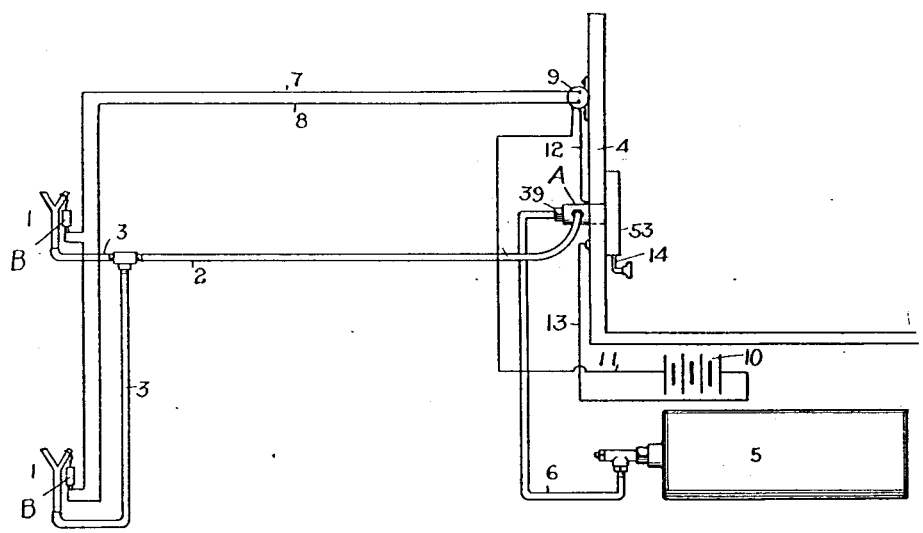
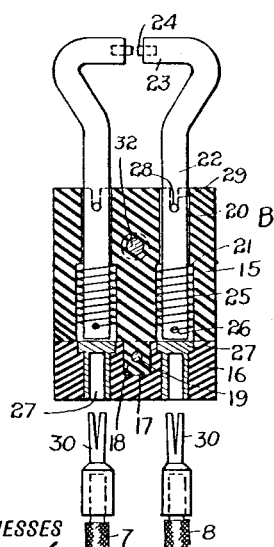
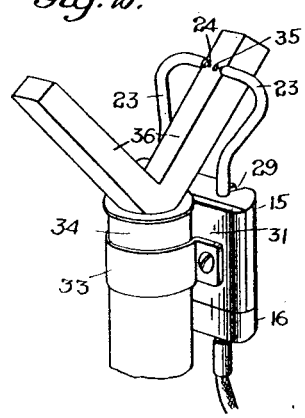
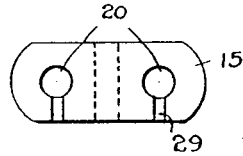
WITNESSES
E. W. Callaghan
C. Bradway.
INVENTORS
JOSEPH W. LUNDAHL,
OSCAR ARVID EKSTROM
BY
Munn & Co
ATTORNEYS J. W. LUNDAHL & O. A. EKSTROM.
AUTOMATIC IGNITION SYSTEM FOR GAS LIGHTS.
APPLICATION FILED SEPT. 6, 1913.
1,104,522.
Patented July 21, 1914.
2 SHEETS—SHEET 2.
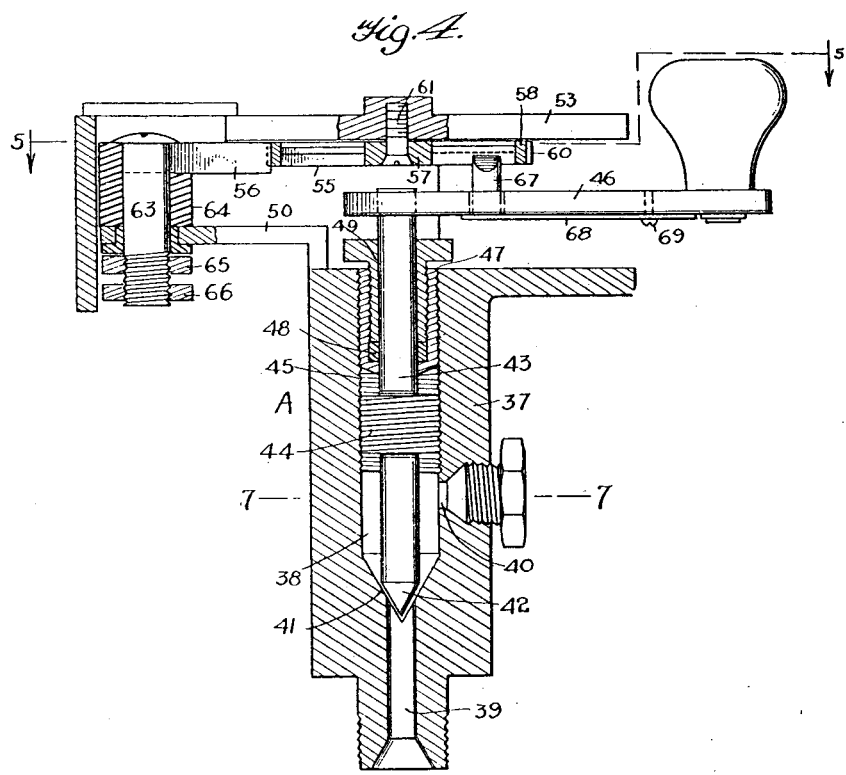
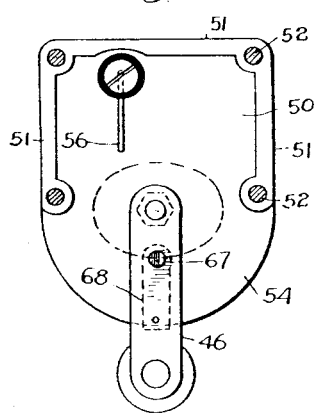
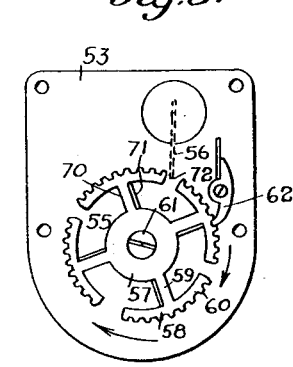
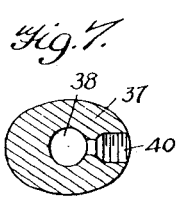
WITNESSES
INVENTORS
JOSEPH W. LUNDAHL,
OSCAR ARVID EKSTROM,
BY
ATTORNEYS

UNITED STATES PATENT OFFICE.

JOSEPH W. LUNDAHL, OF THOMASTON, AND OSCAR ARVID EKSTROM, OF LITCHFIELD, CONNECTICUT, ASSIGNORS OF ONE-HALF TO SAID LUNDAHL, ONE-FOURTH TO SAID EKSTROM, AND ONE-FOURTH TO CARL A. LARSON, OF THOMASTON, CONNECTICUT.

AUTOMATIC IGNITION SYSTEM FOR GAS-LIGHTS.

1,104,522.           Specification of Letters Patent.           Patented July 21, 1914.

Application filed September 6, 1913.  Serial No. 788,405.

*To all whom it may concern:*

Be it known that we, JOSEPH W. LUNDAHL, a citizen of the United States, and OSCAR ARVID EKSTROM, a subject of the King of Sweden, and residents, respectively, of Thomaston, in the county of Litchfield and State of Connecticut, and Litchfield, Fluteville, in the county of Litchfield and State of Connecticut, have invented a new and Improved Automatic Ignition System for Gas-Lights, of which the following is a full, clear, and exact description.

This invention relates to ignition and gas controlled systems especially adapted for use in connection with automobile lamps, whereby the driver can light the lamps by a single controller without moving from the seat, and while the system is useful in this connection it is to be understood that it is applicable for house and other lighting systems where the burners are to be lighted from a remote point.

The invention has for its general object to improve and simplify the construction and operation of combined gas controlling and igniting devices so as to be reliable and efficient in use, comparatively inexpensive to manufacture and install and composed of comparatively few parts.

Another object of the invention is the provision of the make-and-break device which operates simultaneously with the gas valve for opening and closing the primary circuit in rapid succession, so as to produce a high tension current in the secondary circuit for generating igniting sparks at the gas burner or burners, said make-and-break device thereby dispensing with the usual vibrator at the induction coil.

Another object of the invention is to so mount the make-and-break device that the same will be actuated by the handle that operates the needle valve, the make-and-break device including a toothed contact wheel and a spring contact coöperating with the teeth, whereby the movement of the teeth past the spring contact will produce a succession of current impulses through the primary circuit.

An additional object of the invention is the provision of a novel ignition device including electrodes which are movably mounted with respect to each other so that the spark points can be accessible for cleaning and the burner tip can be removed without the necessity of removing the igniter from the burner.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts throughout the several views, Figure 1 is a diagrammatic view of the gas supply and ignition system, such as may be used in an automobile; Fig. 2 is a perspective view of the igniter applied to a burner tip; Fig. 3 is an enlarged sectional view of the igniter; Fig. 3ᴬ is a plan view of one section of the igniter body; Fig. 4 is an enlarged sectional view of the combined make-and-break device and gas valve; Fig. 5 is a sectional view on the line 5—5 of Fig. 4 drawn on a reduced scale; Fig. 6 is a bottom plan view of the top plate of the combined valve and make-and-break device; and Fig. 7 is a sectional view on the line 7—7 of Fig. 4.

Referring to Fig. 1 of the drawing, 1 designates acetylene or other burners, such as are used in the head lights of an automobile, and to these burners gas is supplied through a pipe 2 and branches 3, the pipe 2 being connected with a valve and make-and-break device A mounted on the dashboard 4 of the automobile. The gas may be derived from a storage tank 5 or suitable generator connected by a pipe 6 with the valve device A. At each burner 1 is an ignition device B which has its electrodes connected respectively with wires 7 and 8 which lead from the burners through an induction coil 9; the secondary of the induction coil, wires 7 and 8 and the electrodes of the ignition device B forming the secondary circuit of the ignition system. The primary circuit consists of a battery or other source of current 10, wire 11, primary of the induction coil 9, wire 12, make-and-break device A and wire 13. By operating the handle 14 of the combined valve and make-and-break device A the supply of gas to the burners is turned on and the primary circuit of the ignition system is successively closed and opened, whereby the gas is ignited at the burners 1. In turning off the gas the make-and-break means is not operated because of a special arrangement of parts hereinafter described.

The igniter B comprises a body composed of block-like sections 15 and 16 of porcelain or other insulating material, one section having a socket 17 into which projects a boss or tenon 18, and through the walls of the socket and through the tenon extends a pin 19 which holds the two sections together. The section 15 has vertically extending passages 20, each provided with a shoulder 21 and in each passage is the shank or stem portion 22 of an electrode 23, the upper extremity of the electrode being bent laterally and having a platinum or other spark point 24. In the lower end of each passage 21 is a helical compression spring 25 having one end seated on a shoulder 21 and the other end engaged in an opening 26 in the lower end of the stem of the electrode, whereby such lower end is maintained in contact with a socket piece or contact 27 in the lower section 16 of the igniter body. On each electrode is a pin or equivalent device 28 which extends into a recess 29 in the upper surface of the igniter body. The parts are so disposed that when the pins 28 of the electrodes are in their respective sockets the spark points 24 are opposite each other. By pulling upwardly on the electrodes the springs 25 yield and permit the pins 28 to be removed from the recesses 29, when the electrodes can be turned so as to throw the spark points in a position where they can be readily cleaned. When the electrodes are turned back the springs 25 cause the electrodes to be moved downwardly so that the pins 28 engage in the recesses 29. By making the electrodes movable in the manner described it is possible to take out the tip of the burner without the igniter being removed from the latter. As shown in Fig. 3, the terminal sockets 27 are adapted to receive spring plugs or terminals 30 which are fastened to the wires 7 and 8 of the secondary circuit. On one side of the section 15 of the igniter body is a plate 31 held in place by a screw or bolt 32, Fig. 3, and attached to this plate is a strap or holder 33 which embraces the body 34 of the burner, the holder being so positioned that the electrode 23 will be disposed in proper relation to the jet orifice 35 of one of the branches of the burner tip 36.

A combined valve and make-and-break device A shown in Figs. 4 to 7 inclusive comprises a valve body 37 that is formed with a chamber 38 having an inlet 39 and an outlet 40 to which the pipes 6 and 2, Fig. 1, are respectively connected. At the inner end of the inlet passage 39 is a valve seat 41 that is adapted to engage a needle valve 42. The stem 43 of the valve has a threaded enlargement 44 which engages the internal threads 45 of the body 37, so that by turning the stem 43 through an operating handle 46 in the outer end of such stem the conical portion 42 of the needle valve will be moved into or out of engagement with the seat 41 to cut off or open the valve supply. Into the upper end of the valve body 37 is screwed a packing box 47 which contains a packing 48 that is compressed by a gland 49. The valve body 37 is provided with a plate 50 which has flanges 51 at three sides, and applied to these flanges and secured thereto by screws or other fastenings 52 is a cover plate 53, so that the plate 50, flanges 51 and cover plate 53 form a chamber that is open at 54, so that the handle or lever of the valve stem can project therefrom. In this housing or chamber is a make-and-break device which consists of a rotary element or wheel 55 and a spring 56, the wheel forming one contact and the spring the other contact of the make-and-break device. The wheel consists of a hub 57 and segmental peripheral portions 58 connected by spokes 59 with the hub, and the peripheral portions are provided with teeth 60 with which the spring contact 56 is adapted to engage, whereby the circuit is made and broken in quick succession as the wheel is turned. The wheel 55 is fastened to the cover plate 53 by a screw or equivalent device 61 and on the cover plate is a spring-pressed pawl 62 that is adapted to engage the teeth 60 so as to prevent back movement of the contact wheel. The spring contact 56 is mounted on a post 63 which is in the form of a screw bolt that passes through the plate 50 but is insulated therefrom by insulation 64, and on the lower end of the screw 63 are nuts 65 and 66 to which the wire 13, Fig. 1, is connected, the nut 65 serving to clamp the post or bolt 63 in place. The wire 12 is grounded on a suitable part of the body 37 of the valve and make-and-break device A, so that when the spring 56 is in engagement with a toothed segment of the rotary element 55 the primary circuit will be completed. The rotary element 55 is adopted to be actuated by a pawl 67 carried on a leaf spring 68 that is fastened at 69 on the valve handle 46. The pawl 67 is adapted to engage the side 70 of the spoke 59 to move the rotary element 55 one step in a clockwise direction, Fig. 6, the hold-back pawl 62 yielding during this movement. The opposite side of each spoke is beveled at 71 so that the handle of the valve can be returned without the spokes interfering, as the pawl 67 will slide under the spikes. With the arrangement shown a quarter turn of the needle valve will be sufficient to open the supply of gas, and by this movement one toothed segment 58 will move by the spring contact 56, causing thereby a succession of sparks to be produced at each igniter. When the parts are at rest the spring contact 56 is disposed in one of the gaps 72 between adjacent toothed segments 58, so that the circuit will not be closed to waste current. With this arrangement it is seen that a controller such as the handle 46 serves to open and close the supply of gas, and also to create successive current impulses in the primary circuit, whereby is induced in the secondary circuit the necessary high tension impulses that produce the sparks at the igniter electrodes.

From the foregoing description taken in connection with the accompanying drawings, the advantages of the method of operation and of the apparatus shown will be readily understood by those skilled in the art to which the invention appertains, and while we have described the apparatus which we now consider to be the best embodiment thereof, we desire to have it understood that the apparatus shown is merely illustrative, and that such changes may be made when desired as are within the scope of the appended claims.

Having thus described our invention, we claim as new and desire to secure by Letters Patent:

1. In a system of the class described, the combination of a burner, a valve for controlling the supply of gas thereto, an igniter for the burner, an induction coil having its secondary winding connected therewith, and a primary circuit including a make-and-break device having a movable element movable with the valve for producing in the primary circuit a succession of current impulses.

2. In a system of the class described, the combination of a burner, a valve controlling the supply of fuel thereto, an igniter for the burner, an electric circuit for the igniter, and a make-and-break device for the said circuit, said device including an element movable with the valve and having a plurality of contact points, and a contact disposed in a path of and engageable by the contact points for producing a succession of current impulses during the opening movement of the valve.

3. In a system of the class described, the combination of a burner, a valve controlling the supply of fuel thereto, an igniter for the burner, an electric circuit for the igniter, and a make-and-break device for the said circuit, said device including an element movable with the valve and having a plurality of contact points, a contact disposed in the path of and engageable by the contact points for producing a succession of current impulses during the opening movement of the valve, and means for arresting the movable element during the closing movement of the valve.

4. In a system of the class described, the combination of a burner, a valve controlling the supply of fuel thereto, a pawl movable with the valve, and an ignition means for the burner including a make-and-break device, said device comprising a toothed element with which the pawl engages for movement with the valve in one direction, and a contact disposed in wiping relation with the toothed element.

5. In a system of the class described, the combination of a burner, a valve controlling the supply of fuel thereto, a pawl movable with the valve, and an ignition means for the burner including a make-and-break device, said device comprising a toothed element with which the pawl engages for movement with the valve in one direction, a contact disposed in wiping relation with the toothed element, and a device for preventing movement of the toothed element as the valve is moved closed.

6. In a system of the class described, the combination of a burner, an igniter, a make-and-break device including a spring contact and a rotary element having separated segmental toothed portions arranged in the path of and engageable with the contact, and means for arresting the toothed element when the contact is disposed between adjacent toothed portions.

7. In a system of the class described, the combination of a burner, an igniter, a make-and-break device including a spring contact and a rotary element having separated segmental toothed portions arranged in the path of and engageable with the contact, means for arresting the toothed element when the contact is disposed between adjacent toothed portions, an actuator for moving the toothed element in one direction, and means for preventing movement of the element in the opposite direction.

8. A combined valve and ignition device comprising a valve body, a seating element in the body, an actuator for the said element, a circuit-controlling means including a contact and a movable toothed element, and means on the actuator for engaging the toothed element for moving the same in one direction.

9. A combined valve and make-and-break device comprising a valve body, an element therein for controlling the flow of gas, a handle on the valve, a pawl carried by the handle, a rotary element having a plurality of toothed contact segments, means on the element with which the pawl is adapted to engage for moving the element in one direction, a pawl engaging the teeth of the element for preventing backward movement thereof, and a contact spring insulated from the element and adapted to be engaged by the teeth of the latter as the element is turned.

10. A combined valve and make-and-break device comprising a valve body, a valve therein, a housing on the valve body, a handle connected with the valve and extending out of the housing, one part of the housing being removable, a rotary contact element on the removable part of the housing, a pawl on the handle arranged to engage the rotary element for turning the same, and a contact fixed in the housing to engage the rotary contact element for making and breaking the circuit.

11. An ignition device of the class described comprising a body, an electrode rotatably mounted therein, a contact within the body, a spring for normally urging the electrode against the contact, said body having a recess, and a pin on the electrode held in the recess by the spring, said electrode being movable longitudinally against the tension of the spring to disengage the pin from the recess for permitting the electrode to be turned.

12. An igniter of the class described comprising a body, fixed contacts therein, electrodes mounted for longitudinal and rotary movement in the said body, springs acting on the movable electrodes to maintain them in engagement with the contacts, devices on the electrodes, and means on the body with which the said devices engage for holding the electrodes normally in operative position.

13. An igniter of the class described comprising a body, contacts mounted therein, a pair of electrodes longitudinally and rotatably mounted in the body, springs for maintaining the electrodes in engagement with the contacts, and means for preventing rotation of the electrodes while they are in engagement with said contacts.

In testimony whereof I have signed my name to this specification in the presence of two subscribing witnesses.

JOSEPH W. LUNDAHL.

Witnesses to the signature of J. W. Lundahl:
GEORGE SANGSTER,
ANTON J. NORBERG.

In testimony whereof I have signed my name to this specification in the presence of two subscribing witnesses.

OSCAR ARVID EKSTROM.

Witnesses to the signature of Oscar Arvid Ekstrom:
CARL A. LARSON,
JOHN E. JOHNSTON.

---

Copies of this patent may be obtained for five cents each, by addressing the "Commissioner of Patents, Washington, D. C."